106. COMPOSITIONS, COATING OR PLASTIC
79

Patented Sept. 30, 1930

1,777,162

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

ADHESIVE WATER-RESISTING COMPOSITION OF MATTER

No Drawing. Application filed July 21, 1927. Serial No. 207,583.

This invention relates to the treatment of normally water-resisting or inaqueous colloids of a flexible nature with an alkaline earth hydroxide and a water-soluble compound of boron with a proteinous, albuminous, carbohydrate and other water-soluble, water-absorbing and water-miscible colloidal substances.

Another object of my invention is to produce a glue with varying degrees of adhesive strength which will not necessarily have a strong caustic action on the articles or materials glued.

Another object of my invention is to make a glue that contains rubber and which may be vulcanized. Other objects of my invention will appear in the specification.

By the alkaline earth hydroxides are meant the hydroxides of such as calcium, barium, strontium or magnesium, but more particularly of calcium as that element seems to give best results when in its hydroxide state. It is to be understood that the oxides of such substances are within the purview of my disclosure, as the oxides when used in the presence of water will generally be changed to hydroxides. Further, the oxides or the hydroxides may be the natural earthy substances or they may be the product of chemical processes as for instance the precipitation of calcium hydroxide from other calcium compounds. The alkaline hydroxides as produced from calcined marine shells or bony materials may also be advantageously utilized in my invention.

The flexible gums such as chicle or chicle substitutes, balata, gutta-percha, rubber or rubber containing substances either natural or synthetic may be used in their crude gummy form or may be aqueously dispersed in the making of the compositions herein disclosed. That is, they may be dissolved in an organic solvent and then aqueously dispersed by the various dispersing substances or water-absorbing colloids or they may be masticated therewith. Or if obtainable, the gummy substances may be initially used in their artificial or natural aqueous dispersed state. A good example of this is natural rubber latex in pure or treated or preserved condition. Said latex generally being preserved with about 3% of an alkali such as ammonia.

If the normally inaqueous and water-resisting flexible colloids are unstable and if a strong adhesive is desired, a hydrophillic colloid like casein or animal glue or starch and particularly cassava, may be added to the water-resisting colloid in aqueous dispersion or the water-soluble hydrophillic colloid may be initially treated with the alkaline earth hydroxide in order to not only make the hydrophillic colloid more water-resisting but to break the colloid down and thereby make a thinner solution, and especially so if the boron compound or borax, is added to it with the alkaline earth compound. Other colloidal materials like water-soluble oils, soaps, water-soluble gums like karaya, arabic, tragacanth and colloidal clays may be advantageously used in my composition. If a strong glue is desired blood or blood albumen may be subjected to the alkaline earth hydroxide and borax or added to the aqueous dispersion of the inaqueous colloid. Water-soluble silicates may be added to the aqueous dispersion, but in doing so care should be taken to avoid curdling or precipitation on the addition of the earth hydroxide or the boron compound. If this curdling is undesirable it may be avoided by first making up the composition with a water-soluble colloid that is compatible to the alkaline earth hydroxide and the boron compound. The water-soluble silicate such as sodium silicate may then be cautiously added, if not in too large amounts, and the curdling avoided. A good water-soluble colloid to be used as above stated is casein which should be in solution to give the intended results.

As an example of one embodiment of my invention that may be used as a moderately strong wood glue will be given the following:

| | Parts by weight |
|---|---|
| Casein (commercial grades) | 50 |
| Calcium hydroxide | 12 |
| Sodium borate (commercial borax) | 7 |
| Water (to dissolve the above) | 130 |

After the above has been allowed to dissolve, add rubber latex (approximately 35% rubber content) 150 parts by weight.

When the composition is to be used as an adhesive size or base for a plastic vehicle or as a coating base, the following proportions may be advantageously utilized:

| | Parts by weight |
|---|---|
| Casein | 50 |
| Turkey red oil | 5 |
| Bentonite clay | 10 |
| Blood albumen | 10 |
| Animal glue | 100 |
| Calcium hydroxide | 30 |
| Sodium borate (borax) | 30 |
| Sodium silicate | 30 |
| Water | 400 |
| Beech wood creosote oil | 4 |

The casein is preferably dissolved first by adding it to the water and then adding the calcium hydroxide and the borax thereto. After which the other ingredients may be added, except the beechwood creosote which is preferably added last. To this composition is added:

| | Parts by weight |
|---|---|
| Rubber latex | 300 |
| Zinc oxide | 20 |
| Litharge | 8 |
| Sulphur | 8 |

The zinc oxide, litharge and sulphur are preferably added to the composition at last, as the sulphur and zinc oxide may have a coagulating effect on the composition or the ingredients thereof.

When the water-soluble colloids are in compositions that may be subjected to dampness or water it is desirable that those colloids or compositions be treated to an insolubilizing or irreversibilizing medium. These agents or mediums may be added to the various ingredients of the composition or to the composition as a whole. Colloids like bentonite clay, water-soluble oils of the turkey red oil type are not as a rule known as insolubilizable colloids, although water-soluble oils seem to revert to an oil condition in the presence of an acid or acid substance. Among these insolubilizing agents are formaldehyde, paraformaldehyde, hexamethylenetetramine, calcium, zinc and copper chlorides, potassium or sodium chromates, alums, tannic acid or tannate compounds thereof; also many of these compounds of an acid nature act as coagulants of the water-soluble colloids and also of the normally inaqueous colloids in aqueous dispersion. Many acid substances like zinc sulphate, and sodium acid sulphate the various acids such as sulphuric, acetic or hydrochloric and many others have a strong coagulating action on the colloids in aqueous dispersion.

When the composition is in liquid form for some time as is the case of a sizing or glue, before using, preserving agents may be added thereto. Among these agents are sodium formate, sodium benzoate, sodium salicylate, beta and alpha naphthol, arsenic, camphor, naphthalene and the many creosote compounds. Oils like citronella, cedar oil, oil of bitter almonds, kerosene or others not only help to preserve but prevent lumping and give the composition a sweet scent.

It is to be understood, of course, that the water-soluble alkaline compound of boron mentioned herein may be other than the commonly known borax, as for instance, the triborates, of a water-soluble nature, of sodium, potassium and other metallic basis. Further, the boron compounds may be single salts, double or triple salts thereof, such as combinations with fluorides, phosphates and the like.

In the examples given only the basic adhesive compositions have been set forth, but in every art and industry there are countless filling and coloring materials that may be added or combined with my composition to satisfy known and definite needs of the particular art of industry. However, the additions of these materials do not need any exercise of inventive research when their properties and characteristics are so well known, alone and in combination with other substances. Of these materials might be mentioned carbon and other blacks, zinc oxide, the carbonates, aluminates and stearates of sodium, calcium, magnesium etc. Or fibrous material like asbestos, cotton, cellulose; shredded or ground cork, wood, or leather. Oils like linseed, castor, China wood, cotton seed, tar oils, heavy petroleum oils, waxes, resins or resin or rosin oils (this oil also acts as an emulsifier and as a thickener). The oily additions are utilized in sizing and coating arts as are the more or less water-insoluble solid materials above named.

The word adhesive is used in my disclosure in its broadest sense and may be co-adhesive or adhesive in nature, and as meaning a dry or a liquid substance. Inherently it may be an adhesive but industrially it may be a sizing, coating, or a vehicle for other materials or as a base for plastic and moldable materials or objects, that is, it may adhere, glue, hold, fix, bind or occlude countless small and finely ground matter or fibres or articles of great size.

In order to achieve certain results as shown in the examples other chemicals that combine with the alkaline earth hydroxide may be used with or in combination with the boron compound. Of these materials might be mentioned sodium fluoride, tri-sodium phosphate, ammonia, ammonium carbonate, sodium tungstate, sodium or potassium carbonate or silicate. The addition of these chemicals bring about new water-insoluble compounds with the alkaline earth hydroxide, and/or new compounds with the colloidal substances.

While I have herein described some particular compositions embodying my invention and methods of producing the same, and also mentioned some of the arts in which my invention may be utilized, it is to be understood that the invention is not limited to those arts, or methods or to the precise ingredients or proportions thereof.

Having thus described my invention, I claim and desire to protect by Letters Patent of the United States:

1. An adhesive composition comprising an aqueous dispersion of rubber latex, casein, and an alkaline earth hydroxide and a compound of boron.

2. An adhesive composition of matter in aqueous dispersion comprising rubber latex, casein, calcium hydroxide and borax.

3. An adhesive composition of matter comprising an aqueous dispersion of a rubber substance, casein, an alkaline earth hydroxide, and a water-soluble alkaline compound of boron.

4. An adhesive composition comprising an aqueous dispersion of rubber, casein, calcium hydroxide and sodium borate.

5. An adhesive composition comprising rubber latex, one hundred parts; casein, one hundred to two hundred parts; calcium hydroxide, twenty to fifty parts; sodium borate, ten to twenty five parts.

6. An adhesive composition comprising rubber latex, casein, calcium hydroxide, sodium borate and sodium carbonate.

In witness whereof I hereunto set my hand this 19th day of July, 1927.

ARTHUR BIDDLE.